US009159141B2

(12) United States Patent
Bordes et al.

(10) Patent No.: US 9,159,141 B2
(45) Date of Patent: Oct. 13, 2015

(54) METHOD FOR RECONSTRUCTING A CURRENT BLOCK OF AN IMAGE AND CORRESPONDING ENCODING METHOD, CORRESPONDING DEVICES AS WELL AS STORAGE MEDIUM CARRYING AN IMAGES ENCODED IN A BIT STREAM

(75) Inventors: Philippe Bordes, Cesson Sevigne Cedex (FR); Dominique Thoreau, Cesson Sevigne Cedex (FR); Jerome Vieron, Paris (FR); Edouard Francois, Bourg des Comptes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 64 days.

(21) Appl. No.: 13/817,070

(22) PCT Filed: Aug. 8, 2011

(86) PCT No.: PCT/EP2011/063623
§ 371 (c)(1),
(2), (4) Date: Apr. 14, 2013

(87) PCT Pub. No.: WO2012/022648
PCT Pub. Date: Feb. 23, 2012

(65) Prior Publication Data
US 2013/0208982 A1   Aug. 15, 2013

(30) Foreign Application Priority Data

Aug. 19, 2010  (EP) .................................. 10305898

(51) Int. Cl.
*G06K 9/36* (2006.01)
*G06K 9/46* (2006.01)
(Continued)

(52) U.S. Cl.
CPC .......... *G06T 9/004* (2013.01); *H04N 19/00218* (2013.01); *H04N 19/00278* (2013.01);
(Continued)

(58) Field of Classification Search
None
See application file for complete search history.

(56) References Cited

U.S. PATENT DOCUMENTS

2002/0118758 A1*  8/2002  Sekiguchi et al. ........ 375/240.18
2007/0064796 A1*  3/2007  Carrig et al. ............. 375/240.08
(Continued)

FOREIGN PATENT DOCUMENTS

CN    101303769    11/2008
CN    101523917    9/2009
(Continued)

OTHER PUBLICATIONS

Divorra Escoda O et al: "Geometry-Adaptive Block Partitioning for Video-Coding" 2007 IEEE International Conference on Acoustics, Speech, and Signal Processing.
(Continued)

*Primary Examiner* — Bhavesh Mehta
*Assistant Examiner* — Feng Niu
(74) *Attorney, Agent, or Firm* — Tutunjian & Bitetto, P.C.

(57) ABSTRACT

The invention is made in the field of image block encoding and reconstruction. A method for reconstructing a current block of an image is described, the current block being encoded using predictive encoding of segments resulting from geometry adaptive block partitioning of said current block. After decoding encoded data comprising at least one flag and motion vectors, wherein blocks referenced by the motion vectors are used for prediction of segments of the current block, the at least one flag and an encoding order of the motion vectors in the encoded data is used for determining which of the referenced blocks exhibits a geometry that matches the geometry of the current block and for determining a segment of the determined block, wherein prior to determining the segment, the determined block is geometry adaptive block partitioned into segments from which the segment is determined for predicting one of the segments of the current block.

17 Claims, 2 Drawing Sheets

(51) Int. Cl.
*G06T 9/00* (2006.01)
*H04N 19/543* (2014.01)
*H04N 19/176* (2014.01)
*H04N 19/159* (2014.01)

(52) U.S. Cl.
CPC ....... *H04N19/00624* (2013.01); *H04N 19/159* (2014.11); *H04N 19/176* (2014.11); *H04N 19/543* (2014.11)

(56) References Cited

U.S. PATENT DOCUMENTS

| | | | | |
|---|---|---|---|---|
| 2007/0230830 | A1* | 10/2007 | Ohwaki et al. | 382/300 |
| 2009/0060362 | A1* | 3/2009 | Harmanci et al. | 382/238 |
| 2009/0268810 | A1 | 10/2009 | Dai | |

FOREIGN PATENT DOCUMENTS

| | | |
|---|---|---|
| EP | 1351510 | 10/2003 |
| WO | WO2008016605 | 2/2008 |
| WO | WO2008054688 | 5/2008 |

OTHER PUBLICATIONS

Abdullah A Muhit et al: "Motion compensation using geometry and elastic motion model" Image Processing (ICIP), 2009 16th IEEE International Conference on, IEEE, Piscataway, NJ, USA.

Search Report Dated Dec. 12, 2011.

Hung et al., "On Macroblock Partition for Motion Compensation", 2006 International Conference on Image Processing, Atlanta, Georgia, USA, Oct. 8, 2006, pp. 1697-1700.

Marques et al., "Prediction of Image Partitions Using Fourier Descriptors: Application to Segmentation Based Coding Schemes", IEEE Transactions on Image Processing, vol. 7, No. 4, Apr. 1998, pp. 529-542.

Zhang et al., "Quadtree Structured Region-Wise Motion Compensation for Video Compression", IEEE Transactions on Circuits and Systems for Video Technology, vol. 9, No. 5, Aug. 1999, pp. 808-822.

Kondo et al., "Motion-compensated video coding using sliced books", Systems and Computers in Japan, vol. 38, No. 7, 2007, pp. 12-22.

Chupeau et al., "Motion-based segmentation for object-based video coding and indexing", Image and Video Communications and Processing 2000, SPIE, vol. 3974 (2000), pp. 853-860.

Dai et al., "Geometry-Adaptive Block Partition for Intra Prediction in Image & Video Coding", IEEE International Conference on Image Processing, 2007. ICIP 2007, Sep. 16, 2007, vol. 6, pp. 85-88.

Mathew et al., "Motion Modeling With Geometry and Quad-Tree Leaf Merging", IEEE International Conference on Image Processing, 2007, Sep. 16, 2007, vol. 2, pp. 297-300.

Mathew et al., "Joint Scalable Modeling of Motion and Boundary Geometry with Quad-Tree Node Merging", 16th IEEE International Conference on Image Processing (ICIP), 2009, Nov. 7, 2009, pp. 3745-3748.

De Forni et al., "The Benefits of Leaf Merging in Quad-Tree Motion Models", Internationapp.l Conference on Image Processing, 2005. ICIP 2005, Sep. 11, 2005, vol. 2, pp. 858-861.

Vermeirsch et al., "New Macro-Block Bipartitioning Modes for Inter Coding", VCEG-AH25, 34th Video Coding Experts Group Meeting, Jan. 12, 2008, Antalya, Turkey, pp. 1-8.

ITU-T-Telecommunication Standardization Sector of ITU, Series H: Audiovisual and Multimedia Systems, Infrastructure of audiovisual services—Coding of moving video, "Advanced video coding for generic audiovisual services", H.264, Feb. 2014, pp. 1-790.

International Organisation for Standardisation, ISO/IEC JTC1/SC29/WG11/N10175, Coding of Moving Pictures and Audio, "Vision and Requirements for High-Performance Video Coding (HVC) Codec" Oct. 2008, Busan, Korea, pp. 1-5.

International Organisation for Standardisation, ISO/IEC JTC1/SC29/WG11/N10553, Coding of Moving Pictures and Audio, "Call for Evidence on High-Performance Video Coding (HVC)", Apr. 2009, Maui, Hawaii, USA, pp. 1-8.

International Organisation for Standardisation, ISO/IEC JTC1/SC29/WG11/N10926, Coding of Moving Pictures and Audio, "Draft Call for Proposals on High-Performance Video Coding (HVC)", Oct. 2009, Xian, China, pp. 1-18.

* cited by examiner

METHOD FOR RECONSTRUCTING A CURRENT BLOCK OF AN IMAGE AND CORRESPONDING ENCODING METHOD, CORRESPONDING DEVICES AS WELL AS STORAGE MEDIUM CARRYING AN IMAGES ENCODED IN A BIT STREAM

This application claims the benefit, under 35 U.S.C. §365 of International Application PCT/EP2011/063623, filed Aug. 06, 2011, which was published in accordance with PCT Article 21(2) on Feb. 23, 2012 in English and which claims the benefit of European patent application No. 10305898.8, filed Aug. 19, 2010.

TECHNICAL FIELD

The invention is made in the field of predictive image block encoding and reconstruction wherein segments resulting from geometry adaptive block partitioning are predicted.

BACKGROUND OF THE INVENTION

Many modern video coding strategies, such as the H.264/AVC standard, use quadtree-based partition structures for coding macro-blocks. Such a structure allows the coding algorithm to adapt to the complicated and non-stationary nature of natural images. Despite the adaptation flexibility of quad-tree partitions, a recent study by C. Dai, O. Escoda, P. Yin, X. Li, C. Gomila, "Geometry-Adaptive block Partitioning for Intra Prediction in Image & Video Coding," Image Processing, 2007, ICIP 2007, IEEE International Conference on Volume 6, Sep. 16, 2007-Oct. 19, 2007, pp VI-85-VI-88, has shown that these are not efficient enough (in terms of rate distortion performance) when images can be locally modelled as 2D piece wise-smooth signals.

Therefore, Dai et al. investigated in said study the use of geometry based block partitioning for modeling 2D piece wise data in the macro-block. They proposed geometric partitions within blocks wherein said partitions are defined by the implicit parametric model of a line: $f(x, y)=x\cos \theta + y \sin \theta - \rho$. The partitioning line, generated by the zero level line of $f(x, y)$ is determined by angle $\theta$ and distance $\rho$. Then, $\theta$ and $\rho$ are encoded and transmitted in the bit-stream for blocks with mode "geo". A gain in PSNR up to 12% was achieved, despite supplemental encoding cost of $\theta$ and $\rho$ in Intra.

R. Mathew and D. S. Taubman described in "Joint Scalable Modeling of Motion and Boundary Geometry with Quad-tree node merging," ICIP 2009, that the geometry model for a given sub-block in the geometry tree can be conveyed by signaling the two intercepts of the line segment with the block boundary. These two intercepts are differentially coded with reference to the boundary geometry of the parent block.

Additionally, to reduce the encoding cost of a traditional but sub-optimal quad-tree, R. D. Forni and D. S. Taubman proposed in "On the Benefits of Leaf Merging in Quad-Tree Motion Models," Image Processing, 2005, ICIP 2005, IEEE International Conference on Image processing, Volume 2, 11-14 Sep. 2005, pp II-858-61, proposed to encode an additional binary merge flag indicating whether or not neighboring leaves have to be merged. If the leaf is to be merged, additional 0, 1 or 2 bits are coded to identify the specific merging direction. With its implementation, the authors experienced gains in PSNR between 0.5 dB to 1 dB compared to H.264/AVC.

SUMMARY OF THE INVENTION

The inventors recognized that, according to prior art, all possible geometry contours have to be tested at the encoder side for an appropriate choice of the encoding mode "geo" which causes the relative complexity of the determination of geometry according to prior art. The inventor further recognized the relative simplicity of the geometries determinable according to prior art.

While investigating these aspects, the inventors found that geometry or object boundary information can be signalled implicitly by referencing a block which depicts essentially the same geometry and is determined for being decoded prior to a block for which the geometry information is signalled.

Therefore, inventors propose a method for reconstructing a current block of an image according to claim 1 and a corresponding method for predictive encoding according to claim 3.

Said method for reconstructing a current block of an image, the current block being encoded using predictive encoding of segments resulting from geometry adaptive block partitioning of said current block, comprises decoding encoded data comprising at least one flag and motion vectors, wherein blocks referenced by the motion vectors are used for prediction of segments of the current block, using the at least one flag and an encoding order of the motion vectors in the encoded data for determining which of the referenced blocks exhibits a geometry that matches the geometry of the current block and for determining a segment of the determined block, wherein prior to determining the segment, the determined block is geometry adaptive block partitioned into segments from which the segment is determined for predicting one of the segments of the current block.

In an embodiment of said method for reconstructing, the encoded data further comprises a residual and said method further comprises using the motion vectors for retrieving the blocks from a storage device, using the determined segment for selecting at least one segment in at least one further referenced block, the selected at least one segment being complementary in contour to the determined segment, and reconstructing the current block using the determined segment, the selected at least one segment and the residual.

Said method for predictive encoding of a current block comprises using predictive encoding of segments resulting from geometry adaptive block partitioning of said current block, and encoding data comprising at least one flag and motion vectors in an encoding order, wherein the at least one flag and the encoding order signals which of the motion vectors references a block which exhibits a geometry that matches the geometry of the current block and further signals which segment of the signalled block is used for predicting one of the segments of the current block, wherein at least one further block referenced by the motion vectors is used for prediction of at least one further segment of the current block.

Thus, the inventors propose to improve the principle of the geometry-adaptive block partitioning for image block coding by steps which enable extraction of more complex Geometry contours than straight lines and further provide a reduction of the encoding cost. The principle is to exploit the implicit Geometry in the source images, by extracting the Geometry information from the images, rather than to determine the Geometry parameters independently from the source image characteristics.

In an embodiment, said method for predictive encoding further comprises using the one segment of the current block for determining, from reconstructed blocks stored in a storage device, the block which exhibits the geometry that matches the geometry of the current block, using a segment of the determined block for determining the at least one further segment, using the at least one further segment for determining the at least one further block; using the segment of the determined block and at least one further segment comprised in the at least one further block for prediction of the segments of the current block; using the determined block and the determined at least one further block for determining the motion vectors; using the prediction for determining a residual of the current block; and quantizing a residual, wherein the encoded data further comprises the quantized residual.

In a further embodiment, the predictive encoding method further comprises reconstructing the current block using the prediction and the quantized residual.

For reconstructing or encoding of other blocks, the reconstructed current block can be stored in the storage device.

Geometry adaptive block partitioning can comprise using a Sobel operator for determining a gradient block for the respective block.

In embodiments of the methods, the image is comprised in an image sequence and at least one motion vector references a block comprised in at least one different image comprised in the image sequence.

Further, a device according to claim 9 is proposed.

Said device is for reconstructing a current block of an image, the current block being encoded using predictive encoding of segments resulting from geometry adaptive block partitioning of said current block, said device comprising means for decoding encoded data comprising at least one flag and motion vectors, wherein segments of the current block are predictable using segments of blocks referenced by the motion vectors, means for using the at least one flag and an encoding order of the motion vectors in the encoded data for determining which of the referenced blocks exhibits a geometry that matches the geometry of the current block and for determining a segment of the determined block, and means for geometry adaptive block partitioning of the determined block into segments prior to determining the segment.

And a further device according to claim 10 is proposed.

Said device is for predictive encoding of a current block of an image, said device comprising means for predictive encoding of segments resulting from geometry adaptive block partitioning of said current block, and means for encoding data comprising at least one flag and motion vectors, wherein the at least one flag and an encoding order of the motion vectors enable determining which of the motion vectors references a block which exhibits a geometry that matches the geometry of the current block and further enable determining which one of the segments of the current block is predictable using a segment of the determinable block, wherein at least one further segment of the current block is predictable using at least one further block referenced by the motion vectors.

A storage medium is proposed, said storage medium carrying an image encoded in encoded data wherein at least one block of the image is encoded according to the method of claim 3.

BRIEF DESCRIPTION OF THE DRAWINGS

Exemplary embodiments of the invention are explained in more detail in the following description by help of the drawing. The exemplary embodiments are explained only for elucidating the invention, but not limiting the invention's disclosure which is only limited by the content of the application and not limiting the scope of protection sought which is defined in the claims.

In the figures.

EXEMPLARY EMBODIMENTS OF THE INVENTION

Figure 1:
FIG. 1 depicts an example source image.
Figure 2:
FIG. 2 depicts an exemplary gradient image determined for the source image.
Figure 4:
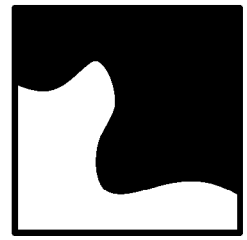
FIG. 4 depicts an example for polynomial block partition.
Figure 5:
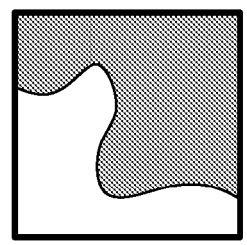
FIG. 5 depicts an example for any shape block partition.
Figure 6:
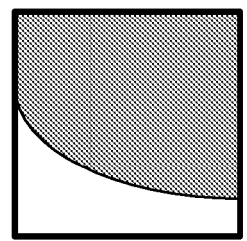
FIG. 6 depicts an example for a binary mask corresponding to the any shape block partition depicted in FIG. 5.
Figure 3:
FIG. 3 depicts exemplary extracted geometry lines in the source image.

The invention may be realized on any electronic device comprising a processing device correspondingly adapted. For instance, the invention may be realized in a television, a set top box, a mobile phone, a personal computer, a digital still camera, a digital video camera, a navigation system or a car video system.

In a first embodiment the Geometry is computed using a traditional edge contour extractor. For instance, (color) gradients of the source and/or the decoded images are used. The gradients image can be computed using the well known sobel algorithm. For a given macro-block decomposition of the image using block size M×N, a traditional Principal Component Analysis (PCA) or linear regression can be used to determine the parameters of the straight line that best match with the gradient points in each M×N blocks.

In a second embodiment, the method using PCA can be extended to non-linear geometry determination by identifying non-linear parameters, for instance polynomial parameters.

Alternatively to said second embodiment, any classical edge detection, like Canny operator or Hough transformation, can be used to determine one or more continuous edges separating the block into partitions.

Independent on how edges are detected, the detected edges can be used for segmenting the respective blocks, e.g. by generating one or more binary mask.

The resulting segments are then predicted using reference blocks. More precisely, segments of the reference blocks are used for predicting the segments of a current block to-be-encoded.

For correct decoding, it is necessary to provide a decoder with motion vectors referencing the reference blocks used for prediction. Further information has to be provided which allows for determining the segments of the reference blocks which are used for prediction.

The further information enables the decoder for determining a partitioning scheme by which the reference blocks can be segmented into segments. The further information further enables the decoder for selecting a segment of each reference block. Combining the selected segments then results in a prediction of a block to-be-reconstructed. A combination of said prediction with a residual further conveyed to the decoder finally results in a reconstruction of the block to-be-reconstructed.

Partly, the further information is implicitly conveyed, for instance by transmission or broadcast, in that there is a reference block used for segment prediction which serves for prediction of the edges, too. Or, a single reference block used for segment prediction serves for prediction of all edges.

First Embodiment

The first embodiment is related to encoding of a block which exhibits a single edge separating the block to-be-encoded into two segments. Each of the two segments is predicted by one reference block, thus there are two blocks determined for prediction which are referenced by two motion vectors. The two referenced blocks are chosen such that one of them not only predicts the segment but also the single edge. That is, at decoder side the one reference block can be segmented for determining the edge which is then used for determining the segment predictions using the one and the other block. For providing the decoder with information required for determining which of the two reference blocks to use for edge prediction and for further determining which of the two segments separated by the edge determined in the edge predicting reference block to-be-used, an encoding order of the two motion vectors and a flag is used.

Either, the block referenced by the motion vector at a predetermined position in the encoding order, e.g. at first position, can be the one dedicated for prediction of the edges. Then, the flag is set in case that said block referenced by the motion vector at the predetermined position is used for prediction of a segment which comprises a predetermined pixel, e.g. the upper left corner pixel or the bottom right corner pixel of the block.

Or, the flag signals whether the first or the second motion vector in encoding order references the block further to be used for prediction of the edge. Then, the encoding order serves for determining the segments to be used for prediction.

Second Embodiment

The second embodiment is related to encoding of a block which depicts two edges separating the block to-be-encoded into three segments. Each of the three segments is predicted by one reference block, thus there are three blocks determined for prediction which are referenced by three motion vectors. The three referenced blocks are chosen such that each of two of them not only predicts one of the segments but also one of the edges. That is, at decoder side these two reference blocks can be segmented for determining the edges which are then used for determining the segment predictions using these two and the one remaining reference block. For providing the decoder with information required for determining which of the three reference blocks to use for edge prediction and for further determining which of the segments separated by the predicted edges to-be-used, an encoding order of the three motion vectors and two flags are used.

For instance, the first motion vector in encoding order references the block predicting a first edge and a first flag signals which of the segments separated by said edge to predict using the first referenced block. The second motion vector, in encoding order, references the block predicting a second edge. The second edge separates the segment complementary to the segment to-be-predicted by the block referenced by the first motion vector into two further segments. A second flag indicates which of the further segments is to be predicted using the second referenced block. The other of the further segments is then predicted using the block referenced by the last motion vector.

Or, the flags signal which two of the three motion vectors reference the blocks further to be used for prediction of the edges. Then, the encoding order serves for determining the segments to be used for prediction.

The second embodiment is actually an iteration of the first embodiment with the first segmentation segmenting a block and the second segmentation segmenting a segment resulting from the first segmentation. It can be further iterated such that n edges are determined using n reference blocks which further predict n segments of (n+1) segments separated by the n edges, the remaining segment being predicted by a further reference block. Then, n flags and the encoding order of motion vectors enable correct decoding.

Third Embodiment

The third embodiment is also related to encoding of a block which depicts two edges separating the block to-be-encoded into three segments. According to the third embodiment, the three referenced blocks are chosen such that one of them not only predicts one of the segments but also both edges. That is, at decoder side this one reference block can be segmented for determining the edges which are then used for determining the segment predictions using these two and the one remaining reference block. For providing the decoder with information required for determining which of the three reference blocks to use for edge prediction and for further determining which of the segments separated by the predicted edges to-be-used, an encoding order of the three motion vectors and two flags are used.

For instance, the first motion vector in encoding order references the block predicting the two edges and the flags signals which of the resulting three segments separated by said edges to predict using the first referenced block. The remaining two segments can be ordered according to a predetermined criterion, e.g. according to the length of the edge common with the segment predicted by the first referenced block. A first segment according to this order is then predicted by the block referenced by the second motion vector in encoding order and a second segment according to this order is then predicted by the block referenced by the last motion vector in encoding order.

Or, the flags signal which one of the three motion vectors reference the block further to be used for prediction of the edges. Then, the encoding order serves for determining the segments to be used for prediction.

Again, this principle can be generalized towards n edges, (n+1) segments predicted by (n+1) reference blocks and n flags.

The invention is based on the principle that contour information of an object boundary of an object at least partly depicted in a block can be conveyed in form of reference to a different block which depicts a most similar or even identical object boundary. In particular, in an embodiment where an image is comprised in an image sequence an object is likely depicted in several images although maybe at different locations due to movement of the object.

Figure 8:
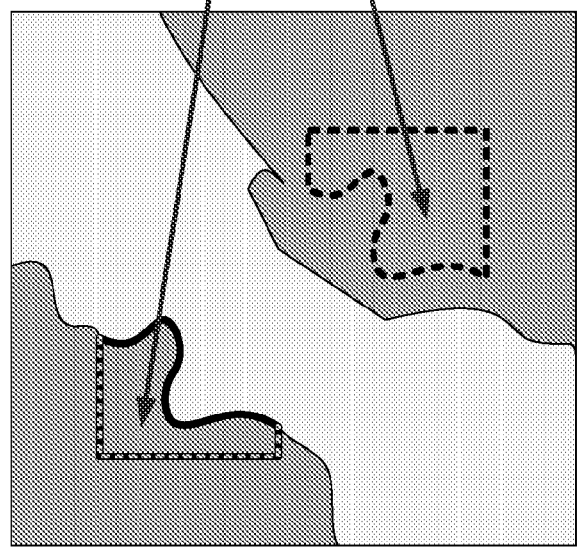
FIG. 8 depicts an example where a bottom right segment of a first reference block and a complementary segment of a different second reference block are used for prediction.
Figure 7:
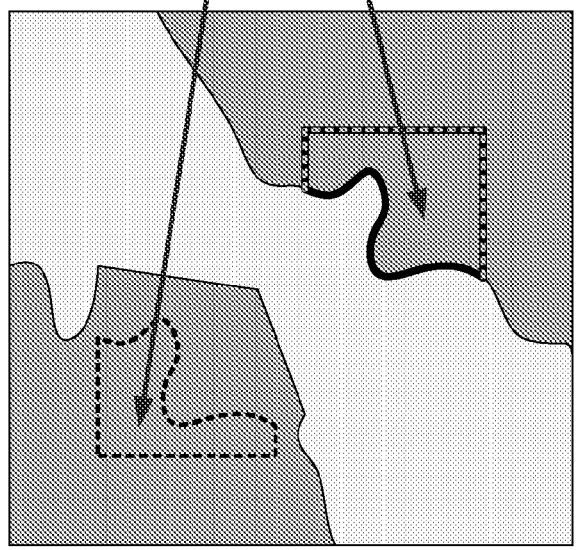
FIG. 7 depicts an example where a top left segment of a first reference block and a complementary segment of a different second reference block are used for prediction.

The different block is one used for prediction of one of the segments resulting from In a particular example of the first embodiment, block reconstruction comprises the following steps:

Parsing the Geo block data:

The binary flags for the Geometry indicate the geo-mode and whether the Geometry is computed using a top-left (TL) or the bottom-right (BR) implicit partition as exemplarily depicted in FIGS. 7 and 8.

As exemplarily depicted in FIG. 7, if the binary flags indicate the BR will determine the Geometry, then the block region pointed out by the motion vector V2 in the reference picture will be used to extract the boundary contour, using one of the segmentation methods described.

As exemplarily depicted in FIG. 8, if the binary flag indicates the TL will determine the Geometry, then the block region pointed out by the motion vector V1 in the reference picture will be used to extract the boundary contour, using one of the segmentation methods described.

Once the boundary contour is extracted, the corresponding mask is computed to selectively motion compensate pixels corresponding to the regions BR and TL. This mask contains for each pixel the weights [0;1] to be used during the motion compensation process.

This example of the first embodiment has the advantage of simplified determination of Geometry at encoder side which in addition allows for extracting more complex geometry.

Further, encoding cost are reduced as the more complex geometry matches depicted object boundaries better and thus result in better predictions. In addition, independent from the complexity of the geometry, a single bit is sufficient.

The invention claimed is:

1. A method for reconstructing a current block of an image, the current block being encoded using predictive encoding of segments resulting from geometry adaptive block partitioning of said current block, said method comprising:
    decoding encoded data comprising at least one flag and motion vectors, wherein blocks referenced by the motion vectors are used for prediction of segments of the current block,
    using the at least one flag and an encoding order of the motion vectors in the encoded data for determining which of the referenced blocks exhibits a geometry that matches the geometry of the current block and for determining a segment of the determined block for predicting one of the segments of the current block, wherein
    prior to determining the segment, geometry adaptive block partitioning the determined block into segments.

2. The method of claim 1, wherein the encoded data further comprises a residual, said method further comprising:
    using the motion vectors for retrieving the blocks from a storage device,
    using the determined segment for selecting at least one segment in at least one further referenced block, the selected at least one segment being complementary in contour to the determined segment, and
    reconstructing the current block using the determined segment, the selected at least one segment and the residual.

3. The method of claim 2, further comprising storing the reconstructed current block in the storage device.

4. The method of claim 1, wherein geometry adaptive block partitioning comprises using a Sobel operator for determining a gradient block for the respective block.

5. The method of claim 1, wherein the image is comprised in an image sequence and at least one motion vector references a block comprised in at least one different image comprised in the image sequence.

6. A method for predictive encoding of a current block of an image, said method comprising:
    using predictive encoding of segments resulting from geometry adaptive block partitioning of said current block, and
    encoding data comprising at least one flag and motion vectors in an encoding order, wherein the at least one flag and the encoding order of the motion vectors describe the geometry adaptive block partitioning of said current block by signalling which of the motion vectors references a block which exhibits a geometry that matches the geometry of the current block, the at least one flag and the encoding order of the motion vectors further signalling which segment of the signalled block is used for predicting one of the segments of the current block, wherein at least one further block referenced by the motion vectors is used for prediction of at least one further segment of the current block.

7. The method of claim 6, further comprising,
    using the one segment of the current block for determining, from reconstructed blocks stored in a storage device, the block which exhibits the geometry that matches the geometry of the current block, using a segment of the determined block for determining the at least one further segment,
    using the at least one further segment for determining the at least one further block;
    using the segment of the determined block and at least one further segment comprised in the at least one further block for prediction of the segments of the current block;
    using the determined block and the determined at least one further block for determining the motion vectors;
    using the prediction for determining a residual of the current block; and
    quantizing a residual, wherein the encoded data further comprises the quantized residual.

8. The method of claim 7, further comprising reconstructing the current block using the prediction and the quantized residual.

9. A non-transitory storage medium carrying instructions of program code for executing the method of claim 6, wherein said program is executed on a computing device.

10. A device for reconstructing a current block of an image, the current block being encoded using predictive encoding of segments resulting from geometry adaptive block partitioning of said current block, said device comprising a hardware processor configured to:
    decode encoded data comprising at least one flag and motion vectors, wherein segments of the current block are predictable using segments of blocks referenced by the motion vectors,
    use the at least one flag and an encoding order of the motion vectors in the encoded data for determining which of the referenced blocks exhibits a geometry that matches the geometry of the current block and for determining a segment of the determined block, and
    geometry adaptive block partitioning of the determined block into segments prior to determining the segment.

11. The device of claim 10, wherein the encoded data further comprises a residual and the hardware processor is further configured to:
    use the motion vectors for retrieving the blocks from a storage device,
    use the determined segment for selecting at least one segment in at least one further referenced block, the selected at least one segment being complementary in contour to the determined segment, and
    reconstruct the current block using the determined segment, the selected at least one segment and the residual.

12. The device of claim 11, wherein the hardware processor is further configured to store the reconstructed current block in the storage device.

13. The device of claim 10, wherein the geometry adaptive block partitioning performed by the hardware processor further comprises using a Sobel operator to determine a gradient block for the respective block.

14. The device of claim 10, wherein the image is comprised in an image sequence and at least one motion vector references a block comprised in at least one different image comprised in the image sequence.

15. A device for predictive encoding of a current block of an image comprising a hardware processor configured to:
    encode segments resulting from geometry adaptive block partitioning of said current block, and
    encode data comprising at least one flag and motion vectors, wherein the at least one flag and an encoding order of the motion vectors describe the geometry adaptive block partitioning of said current block by enabling determining which of the motion vectors references a block which exhibits a geometry that matches the geometry of the current block, wherein the at least one flag and an encoding order of the motion vectors further enable determining which one of the segments of the current block is predictable using a segment of the determinable block, wherein at least one further segment of the current block is predictable using at least one further block referenced by the motion vectors.

16. The device of claim 10, wherein the hardware processor is further configured to:
use the one segment of the current block for determining, from reconstructed blocks stored in a storage device, the block which exhibits the geometry that matches the geometry of the current block, using a segment of the determined block for determining the at least one further segment,
use the at least one further segment to determine the at least one further block;
use the segment of the determined block and at least one further segment comprised in the at least one further block to predict the segments of the current block;
use the determined block and the determined at least one further block to determine the motion vectors;
use the prediction to determine a residual of the current block; and
quantize a residual, wherein the encoded data further comprises the quantized residual.

17. The device of claim 16, wherein the hardware processor is further configured to reconstruct the current block using the prediction and the quantized residual.

* * * * *